United States Patent [19]

Hudson, Jr.

[11] 4,415,187
[45] Nov. 15, 1983

[54] COMPOSITE METAL NIPPLE

[75] Inventor: Sharon J. Hudson, Jr., Toledo, Ohio

[73] Assignee: Sharon Manufacturing Company, Lambertville, Mich.

[21] Appl. No.: 232,646

[22] Filed: Feb. 9, 1981

[51] Int. Cl.$^3$ ............................................ F16L 55/00
[52] U.S. Cl. ..................................... 285/173; 285/287
[58] Field of Search ............... 285/287, 173, 329, 286; 138/104, 143; 228/126, 131, 258

[56] References Cited

U.S. PATENT DOCUMENTS

| | | | |
|---|---|---|---|
| 2,295,623 | 9/1942 | Armstrong | 285/287 |
| 3,633,266 | 1/1972 | Taylor | 285/287 X |
| 3,704,901 | 12/1972 | Borner | 285/173 |
| 3,750,248 | 8/1973 | Morris | 285/287 |
| 3,830,262 | 8/1974 | Lago | 285/173 X |
| 3,858,911 | 1/1975 | Martin | 285/287 |

FOREIGN PATENT DOCUMENTS 585945  2/1947  United Kingdom ................ 285/287

Primary Examiner—Dave W. Arola
Attorney, Agent, or Firm—Harold F. Mensing

[57] ABSTRACT

A tubular metal nipple for joining with the end of a copper tube by means of solder to readily produce a reliable joint in refrigeration plumbing system. The nipple has a inner copper sleeve concentrically spaced from the inside wall of a steel outer casing with an impervious intervening layer of brazing material filling the space and bonding the sleeve to the outer casing. The distal end of the sleeve is tapered or flared outwardly to produce an annular solder well when a tube end is inserted into the nipple.

2 Claims, 3 Drawing Figures

COMPOSITE METAL NIPPLE

SUMMARY OF THE INVENTION

This invention relates to a composite metal fitting or nipple into which the end of a copper tube can be soldered. More specifically, it relates to a nipple which can be integrally connected to a steel vessel or other steel component of a refrigeration system by copper brazing in a furnace and subsequently soldered to a copper tube at a remote installation site with a solder having low or no silver content. The composite metal nipple comprises a tubular outer casing made of steel and a concentrically disposed inner thin copper sleeve extending inwardly from beyond an end of the casing to a depth of more than one diameter. Preferably the nipple has a relatively large diameter outer end for connection to an insertable copper tube and a smaller diameter inner end for insertion into an inlet or outlet aperture of a steel component, such as a suction accumulator, receiver or compressor unit, of a refrigeration system. The outer end section of the casing containing the thin tubular copper sleeve has an inside diameter that is slightly greater than the outside diameter of the sleeve to provide a narrow annular space therebetween. An intervening layer of fused impervious copper brazing material fills this annular space and integrally bonds the adjoining sleeve and casing sections together. The outer end of the sleeve may be flared or angled outwardly to provide an annular solder well in cooperation with an adjacent end of a copper tube when the tube is inserted in the nipple. A reliable gas-tight soldered connection having the required strength and resistance to fatigue can be made readily and economically with a low silver content solder or even one without any silver.

At present unlined steel nipples are being used and reliable steel-to-copper solder connections which meet the refrigeration industry requirements are achieved only by using a solder having a high silver content. Silver solder is not only expensive but its use requires higher temperatures than are necessary with ordinary solders used in making copper-to-copper connections.

The features, advantages and details of this invention will be understood best if the following description is read in conjunction with the accompanying drawings showing the preferred embodiment of this invention.

DETAILED DESCRIPTION OF THE INVENTION

Figure 3:
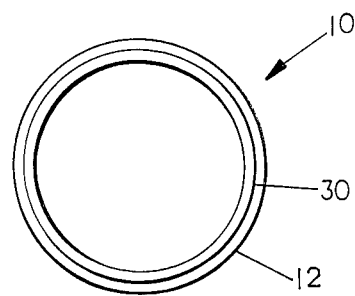
FIG. 3 is a top view of the fitting of FIG. 1.
Figure 1:
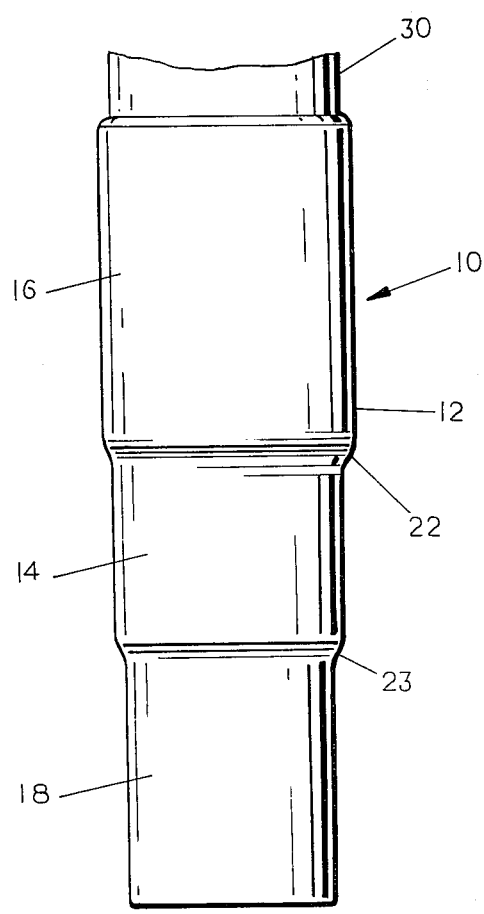
FIG. 1 is an elevational view of the tubular fitting of this invention with a broken away section of copper tubing soldered in place therein.

The preferred embodiment of the composite metal nipple 10 of this invention comprises a tubular steel casing 12 having a cylindrical midsection 14 of a certain diameter with a larger diameter section 16 at one end and a smaller diameter section 18 at the other end thereof. The larger diameter end 16, designated as the outer end for the sake of description, has a concentrically disposed copper sleeve 20 which extends from beyond the end to an annular shoulder 22 located at the transition between the outer end section 16 and the midsection 14. The smaller diameter end section 18 of the composite metal nipple 10 is sized for a press fit with respect to an inlet or outlet aperture of a steel object, such a pressure vessel into which it may be brazed. It has an annular shoulder 23 where it joins the midsection 14. The shoulder functions as a tapered stop which limits how far the nipple may be pressed into its vessel aperture. The nipple 10 may be foreshortened by eliminating the smaller diameter end section 18 and sizing section 14, which had been designated as the midsection, for a press fit in an aperture.

Figure 2:
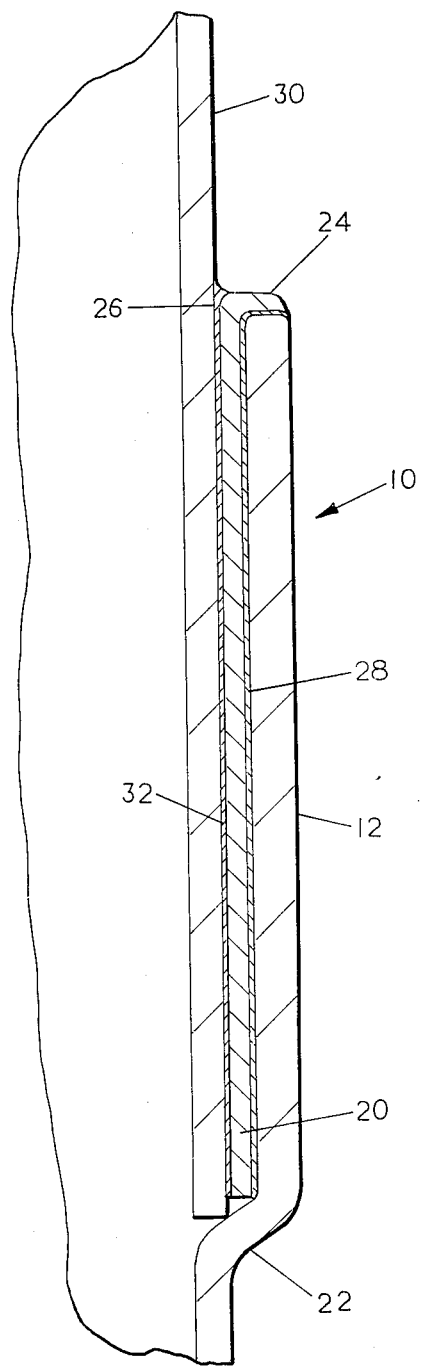
FIG. 2 is an enlarged fragmentary sectional view of the upper portion of the fitting of FIG. 1 showing the solder well at the top of the fitting as well as the various metal layers.

The end portion 24 of the copper sleeve 20, which extends beyond the steel casing 12, is angled or flared outwardly such that an annular recess or solder well 26 is formed in cooperation with an adjoining portion of a copper pipe or tube 30 when the end of such a tube is inserted into the sleeve end of the nipple, as shown in FIG. 2. Preferably the end portion 24 of sleeve 20 extends radially outward a sufficient distance to cover the edge of the steel casing completely. The sleeve is relatively thin and has a wall thickness of about 0.005 of an inch or more. Preferably it has a wall thickness of between 0.008 and 0.015 an inch. Its outer diameter is 0.010 of an inch or less than the inside diameter of the outer end section 16 of casing 12 leaving a thin annular space therebetween so the sleeve can be inserted into this end without the need of a mechanical force.

The outside of the copper sleeve 20 is bonded to the inside of the steel casing by an impervious layer 28 of fused copper brazing material. A brazing material having a melting point below that of the thin copper sleeve is used. Preferably the brazing material has a melting point above 1830° F. such as any of the following commercially available compositions.

| Copper Alloy Brazing Compositions | | | | |
|---|---|---|---|---|
| | CDA 510 | CDA 521 | CDA 655 | CDA 542 |
| Copper | 94.8 | 91.9 | 95.8 | 89.75 |
| Tin | 5.0 | 8.0 | | 10. |
| Phosphorous | .2 | .1 | | .25 |
| Silicon | | | 3.4 | |
| Tin and Manganese | | | .75 | |
| Melting Point | 1922° F. | 1880° F. | 1866° F. | 1832° F. |

The preferred method of brazing is by means of a brazing furnace utilizing a protective atmosphere.

While the composite metal nipple of this invention has been described with respect to a specific embodiment it is to be understood that modifications or other alternatives will become apparent to those skilled in the art without departing from the scope of this invention which is defined primarily by the appended claims.

What is claimed is:

1. A composite metal nipple comprising: a tubular steel outer casing having a larger diameter end section connected to a smaller diameter section, an annular shoulder intermediate said sections, tubular copper sleeve extending from beyond the outer end of said larger diameter casing section to said shoulder and defining a circumferentially continuous, surface thereat, said sleeve being concentrically disposed on the inside of said larger diameter casing section and having an outside diameter less than the inside diameter of the surrounding portion of said casing to provide an annular space therebetween, all of said portion of said sleeve extending beyond said casing being flared outwardly and extending radially outward a sufficient distance to cover the edge of said casing completely and defining a continuation of said annular space between said flare and said edge and to further provide an annular solder well in cooperation with an adjacent portion of a copper tube when such a tube is inserted into said nipple, and an impervious layer of fused copper alloy brazing material completely filling said annular space integrally joining said sleeve to said casing.

2. A composite metal nipple comprising: a tubular steel outer casing having a larger diameter section connected to one end of an intermediate section by means of a first shoulder, a smaller diameter section connected to the other end of said intermediate section by means of a second annular shoulder, a tubular copper sleeve extending from beyond the outer end of said larger diameter section to said first shoulder and defining a circumferentially continuous surface thereat, said sleeve being concentrically disposed on the inside of said larger diameter casing section, said sleeve having a wall thickness of between 0.005 and 0.015 of an inch and an outside diameter less than the inside diameter of the surrounding portion of said casing to provide an annular space therebetween of less than 0.010 of an inch wall clearance, all of said portion of said sleeve extending beyond said casing extending radially outward a sufficient distance to cover the edge of said casing completely and defining a continuation and of said annular space between said outwardly extending portion and said edge and to further provide an annular solder well in cooperation with an adjacent portion of a copper tube when such a tube is inserted into said sleeve, and an impervious fused copper alloy brazing material layer comprised of between 90 and 95 percent copper by weight completely filling said annular space integrally bonding said sleeve to casing, said fused layer being produced by means of a brazing furnace utilizing a protective atmosphere.

* * * * *